(12) United States Patent
Guerpillon (10) Patent No.: US 11,816,903 B2
(45) Date of Patent: Nov. 14, 2023

(54) METHOD FOR DETERMINING A TYPE OF PARKING SPACE

(71) Applicants: RENAULT s.a.s., Boulogne-Billancourt (FR); NISSAN MOTOR CO., LTD., Yokohama (JP)

(72) Inventor: Mathieu Guerpillon, Guyancourt (FR)

(73) Assignees: RENAULT s.a.s., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 284 days.

(21) Appl. No.: 17/264,069

(22) PCT Filed: Jul. 8, 2019

(86) PCT No.: PCT/EP2019/068259
§ 371 (c)(1),
(2) Date: Jan. 28, 2021

(87) PCT Pub. No.: WO2020/025260
PCT Pub. Date: Feb. 6, 2020

(65) Prior Publication Data
US 2021/0350151 A1    Nov. 11, 2021

(30) Foreign Application Priority Data
Jul. 31, 2018 (FR) ........................... 18 57135

(51) Int. Cl.
*G06V 20/58* (2022.01)

(52) U.S. Cl.
CPC ................... *G06V 20/586* (2022.01)

(58) Field of Classification Search
CPC ..... G06V 20/586; G06V 10/44; G06V 10/225
See application file for complete search history.

(56) References Cited

U.S. PATENT DOCUMENTS

| | | | | |
|---|---|---|---|---|
| 6,999,003 B2* | 2/2006 | Matsukawa | ............ | G08G 1/165 340/436 |
| 7,054,729 B2* | 5/2006 | Maier | ................. | G06V 20/586 340/932.2 |
| 7,894,631 B2* | 2/2011 | Kakinami | ............... | G06V 20/58 701/72 |
| 7,924,171 B2* | 4/2011 | Kawabata | ............ | B62D 15/027 340/435 |

(Continued)

FOREIGN PATENT DOCUMENTS

| | | |
|---|---|---|
| DE | 10 2010 056 217 A1 | 6/2012 |
| DE | 10 2012 018 112 A1 | 3/2014 |

OTHER PUBLICATIONS

International Search Report dated Dec. 10, 2019 in PCT/EP2019/068259, 5 pages.

(Continued)

*Primary Examiner* — Manav Seth
(74) *Attorney, Agent, or Firm* — Oblon, McClelland, Maier & Neustadt, L.L.P.

(57) ABSTRACT

A method for determining a type of parking space for a motor vehicle includes detecting a target, evaluating an orientation of the target relative to a road, and determining a type of parking space on the basis of the evaluated orientation. The detecting the target is implemented by a frontal camera of the vehicle.

11 Claims, 3 Drawing Sheets

(56) References Cited

U.S. PATENT DOCUMENTS

| | | | | |
|---|---|---|---|---|
| 8,434,277 | B2* | 5/2013 | Paolucci | E04H 6/10 |
| | | | | 52/177 |
| 8,542,128 | B2* | 9/2013 | Kawabata | G08G 1/168 |
| | | | | 340/932.2 |
| 9,045,160 | B2* | 6/2015 | Pampus | G06V 20/586 |
| 9,499,167 | B2* | 11/2016 | Vorobieva | B62D 15/027 |
| 10,140,858 | B2* | 11/2018 | Chinomi | H04W 4/40 |
| 10,163,016 | B2* | 12/2018 | Hayakawa | B62D 15/0285 |
| 10,198,950 | B2* | 2/2019 | Hayakawa | B60R 21/00 |
| 10,262,537 | B1* | 4/2019 | Kim | H04W 4/44 |
| 10,319,233 | B2* | 6/2019 | Hayakawa | B60R 21/00 |
| 10,449,955 | B2* | 10/2019 | Kim | B60W 30/06 |
| 10,583,829 | B2* | 3/2020 | Kim | B62D 15/028 |
| 10,703,360 | B2* | 7/2020 | Kojo | G06V 20/64 |
| 10,712,445 | B2* | 7/2020 | Kempf | G01S 15/931 |
| 11,524,698 | B2* | 12/2022 | Oba | B60W 60/005 |
| 11,535,459 | B2* | 12/2022 | Lautenschlager | B65G 1/00 |
| 11,537,134 | B1* | 12/2022 | Wiest | G05D 1/0221 |
| 11,538,255 | B2* | 12/2022 | Gibbs | G08G 1/0175 |

OTHER PUBLICATIONS

Mahdi Rezaei, et al. "Computer Vision for Driver Assistance" Springer. XP055592673, Jan. 1, 2017, pp. 149 and 168-171.
Fan Xiaocong. "Real-Time Embedded Systems Design" Elsevier, XP055592720, Jan. 1, 2015, p. 13.

* cited by examiner

METHOD FOR DETERMINING A TYPE OF PARKING SPACE

BACKGROUND

The invention relates to the field of parking assistance for a motor vehicle, and more particularly to determining a type of parking space.

Many vehicles are nowadays equipped with automatic parking systems. These systems make it possible to perform a parking maneuver without the involvement of the driver. In order to even further improve driver convenience, the automatic parking systems are coupled to devices for detecting the surroundings of the vehicle in order to determine the presence or the absence of an available parking space. Reference may be made for example to document EP 2 327 608 which describes such a system.

One drawback of this solution is that the type of maneuver to be performed in order to park the vehicle is not determined. For example, the automatic parking system may perform a parallel parking maneuver in order to park the vehicle across several perpendicular parking spaces. This leads to the vehicle being parked inconveniently.

In order to solve this problem, the driver is generally asked to select the type of maneuver that should be performed by the automatic parking system in order to park the vehicle in the available parking space. The problem of improving driver convenience is therefore clearly not solved.

Document EP 2 982 572 describes a device for determining a type of parking space by analyzing a ground marking defining the parking space. Such a solution is not fully satisfactory in that it only works if the parking spaces are well defined by a ground marking and if the ground marking is not erased.

Another solution consists in determining the type of parking space using ultrasound sensors. One drawback of this solution is that the ultrasound detects objects a very short distance away. As a result, an available parking space is often traveled past when the type of this space is determined.

BRIEF SUMMARY

In light of the above, the aim of the invention is to overcome the abovementioned drawbacks.

More particularly, the invention aims to make it possible to determine a type of parking space sufficiently early and even in the event of the absence of ground markings defining the parking spaces.

To this end, what is proposed is a method for determining a type of parking space for a motor vehicle, comprising:
  a phase of detecting a target,
  a phase of evaluating the orientation of the target in relation to a road, and
  a phase of determining a type of parking space on the basis of the evaluated orientation.

According to one general feature of this method, the detection phase is implemented by way of a frontal camera of the vehicle.

The frontal camera of a vehicle is particularly suitable for recognizing targets corresponding to passenger or commercial vehicles. It is then possible to determine the type of parking space based on vehicles that are already parked. The presence of ground markings defining the parking spaces is therefore not necessary. The targets may be situated far in front of the vehicle. The type of parking space may therefore be determined well before the vehicle travels past an available parking space.

In one mode of implementation, in the detection phase, data linked to the target are determined, the data linked to the target comprising a target consecutive detection count signal, a position of the target, a variable representative of the precision of the position of the target, a speed of the target, an orientation of the target and a variable representative of the precision of the orientation of the target, the method furthermore having a filtering phase between the detection phase and the evaluation phase, the filtering phase comprising at least one filtering step chosen from among an imprecise position filtering step, an imprecise orientation filtering step, a moving vehicle filtering step and a phantom detection filtering step.

In the present application, the expression "consecutive detection count signal" is understood to mean a signal that increments upon each detection of the target and is reinitialized when the target is no longer detected in an implementation. Moreover, in the present application, it is considered that the term "filter" will be used in accordance with its usual definition, that is to say subjecting to sorting, and that, at the end of the filtering, a filtered target may be retained or rejected.

In the imprecise position filtering step, the target is rejected if the variable representative of the precision of the position exceeds a position threshold, and if not, the target is retained.

In the imprecise orientation filtering step, the target is rejected if the variable representative of the precision of the orientation exceeds an orientation threshold, and if not, the target is retained.

These imprecise position and orientation filtering steps make it possible to reject targets for which the detection of data is imprecise. These steps are preferably implemented only at the start of the detection of a target and are no longer implemented afterwards.

Preferably, the variables representative of the precision of the respective position and orientation are position and orientation standard deviations.

In the moving vehicle filtering step, the target is rejected if its speed exceeds a speed threshold, and if not, the target is retained.

This filtering step makes it possible to reject targets corresponding to moving vehicles so as to base the determination of the type of parking space only on parked vehicles. Preferably, this step is applied at all times for as long as the target is detected in order to eliminate targets that were initially retained but that then start to move, such as vehicles that were initially stopped at a stop signal or at a traffic light.

In the phantom detection filtering step, the target is rejected if the target consecutive detection count signal is less than a count threshold, and if not, the target is retained.

The phantom detection filtering step makes it possible to reject phantom detections performed by the frontal camera. Preferably, this step is implemented only for targets situated in the field of the frontal camera of the vehicle and is not implemented for the other targets. As an alternative, this step is implemented only at the start of the detection of a target and is no longer implemented afterwards.

According to one advantageous mode of implementation, in the detection phase, a position of the target is determined, the method furthermore comprising a filtering phase between the detection phase and the evaluation phase in which the target is rejected if the distance between the position of the target and the vehicle exceeds a distance threshold, and if not, the target is retained.

This filtering makes it possible to limit the length of the area in which targets are taken into consideration. This is advantageous since a target far away from the vehicle has a greater probability of being of a type different from that of the parking spaces close to the motor vehicle.

Advantageously, in the evaluation phase, an orientation of the road at the location of the target is determined and the orientation of the target in relation to the road is evaluated on the basis of the orientation of the road at the location of target.

Using the orientation of the road at the location of the target allows simple evaluation of the orientation of the target in order to determine the type of parking space when the road has a curve.

In one mode of implementation, if the road has a ground marking, the orientation of the road at the location of the target is determined taking into account the ground marking, if the road does not have any ground markings and if the target is behind the vehicle or at the same location as the vehicle, a past trajectory of the vehicle is determined and the orientation of the road at the location of the target is evaluated on the basis of the past trajectory at the location of the target, and if the road does not have any ground markings and if the target is in front of the vehicle, a probable trajectory of the vehicle is determined and the orientation of the road at the location of the target is evaluated on the basis of the probable trajectory at the point closest to the target.

It is thus possible to determine the orientation of the road even if the road does not have any ground markings and both in front of and behind the vehicle. When the road has a ground marking, the ground marking is taken into account in order to determine the orientation of the road more precisely.

Preferably, when a probable trajectory of the vehicle is determined, at least one scenario is accepted that is chosen from among:
- a speed scenario in which the speed of the vehicle remains constant,
- an acceleration scenario in which the acceleration of the vehicle remains constant,
- a steering wheel angle scenario in which the steering wheel angle of the vehicle remains constant, and
- a drift angle scenario in which the drift angle of the vehicle remains constant.

Such scenarios constitute a compromise for allowing simple and precise determination of the probable trajectory.

In one mode of implementation, in the detection phase, a plurality of targets are detected and, in the determination phase, whatever a target is, at least one first term and one second term are associated with the target, these being chosen from among:
- a parallel parking type term,
- a perpendicular parking type term, and
- a herringbone parking type term, and then a first sum of the first terms of the various targets and a second sum of the second terms of the various targets are calculated, and it is determined whether one of the first and second sums is greater than the other, and preferably whether one of the first and second sums is greater than the other plus a strictly positive offset term.

The type of parking space corresponding to the highest sum has a high probability of being the type of parking space in the area of the vehicle. The offset term makes it possible to adjust the confidence with regard to the determination of the type of parking space.

Preferably, whatever a target is, at least one coefficient is associated with the target and, before the sums are calculated, the terms associated with the target are weighted by the coefficient associated with the target.

For example, the coefficient may be representative of a distance of the target from the vehicle.

It is then taken into account that, the further away a target is from the vehicle, the more probable it is that this target is a vehicle parked differently from the type of parking spaces situated near the vehicle.

For example, the coefficient is representative of taking into account a ground marking on the road in order to evaluate the orientation of the target with respect to the road.

It is then possible to give a lower weight to targets whose orientation has been determined relatively imprecisely.

For example, the coefficient may be representative of a lateral gap between the target and a trajectory of the vehicle.

A target having a high risk of being on another road or on another row of parking spaces is then taken into account to a lesser extent.

According to another aspect, what is proposed is a computer program comprising a code configured so as, when it is executed by a processor or an electronic control unit, to implement the method as defined above.

According to yet another aspect, what is proposed is a device for determining a type of parking space for a motor vehicle, able to be housed on board a motor vehicle, said device comprising:
- a detection module for detecting a target, the detection module being able to be connected in terms of information to a frontal camera of the motor vehicle,
- an evaluation module able to evaluate an orientation of the target in relation to a road, and
- a determination module able to determine a type of parking space, taking into account an orientation evaluated by the evaluation module.

BRIEF DESCRIPTION OF THE DRAWINGS

Other aims, features and advantages of the invention will become apparent on reading the following description, given solely by way of non-limiting example and with reference to the appended drawings, in which.

DETAILED DESCRIPTION

Figure 1:
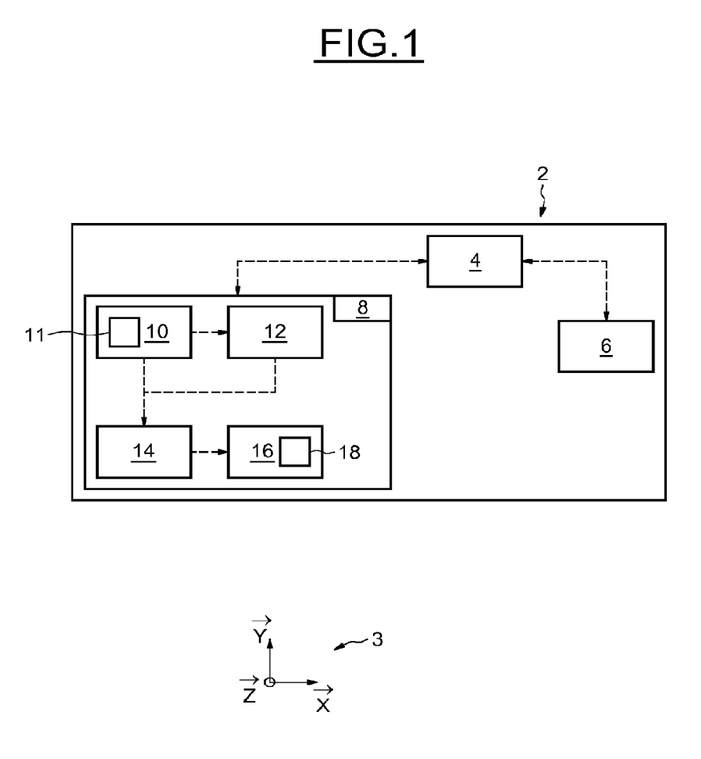
FIG. 1 schematically shows a device according to one aspect of the invention.

With reference to FIG. 1, a motor vehicle 2 is schematically shown. The vehicle 2 is linked to a direct orthonormal vector base 3 conventionally used in motor vehicle design. The orthonormal base 7 comprises a vector $\vec{X}$, a vector $\vec{Y}$ and a vector $\vec{Z}$ perpendicular to the vectors $\vec{X}$ and $\vec{Y}$. The vehicle 2 has an on-board computer 4 connected in terms of information to a frontal camera 6.

The camera 6 also forms part of an advanced driving assistance system of the vehicle 2. Such a system is also known as an advanced driver-assistance system or by the corresponding acronym ADAS. The role of the camera 6 is to gather a plurality of images of the surroundings of the vehicle 2. More particularly, the camera 6 detects images in a field of view situated in front of the vehicle 2, at a maximum distance of 60 m and over an angular aperture contained in a range between 50° and 100° about the direction of the vector $\vec{X}$. In the present application, the term "image" is understood in accordance with its usual definition in the optical field, that is to say as denoting a representation of a solid object given by an optical system.

The camera 6 is capable of isolating, in the gathered images, targets corresponding to leisure vehicles and commercial vehicles. In particular, the camera 6 does not detect pedestrians, trucks, buses, motorcycles, bicycles or even urban furniture that may be situated in its field of view as targets. For each target, the camera 6 is capable of determining data linked to the target comprising:

the position of the target with respect to the vehicle 2,
the speed of the target,
the orientation of the target with respect to the vehicle 2. In the present application, the orientation of a target with respect to the vehicle 2 corresponds to the angle between a longitudinal direction of the target and the vector $\vec{X}$.

The camera 6 is also configured so as to detect the presence of a ground marking. In particular, the camera 6 detects a ground marking defining, on the road, a space intended for traffic flow and a ground marking defining parking spaces. The ground marking defining a space intended for traffic flow may comprise a median line, a hard shoulder line or a line defining a traffic lane. The ground marking defining parking spaces may comprise lines forming a "T" in the angles of the parking spaces. Advantageously, there may be provision for other cameras, such as cameras with a wide-angle field that make it possible to construct a 360° view around the vehicle. Such cameras are commonly known as around view monitoring or by the corresponding acronym AVM.

The vehicle 2 has a device for detecting an available parking space (not shown). Such a device, which is known per se, is capable of providing the on-board computer 4 with information about the existence of an available space for parking the vehicle 2.

The vehicle 2 has a device 8. The role of the device 8 is to determine a type of parking space. More particularly, the device 8 makes it possible to determine a type of parking space even when the parking space is not defined by a ground marking. To this end, the vehicle 2 may also comprise a device for determining a type of parking space on the basis of a ground marking (not shown). The combination of the two devices increases the robustness of the determination when the parking space is defined by a ground marking and allows determination to be performed when the space is not defined by a ground marking. However, it of course does not depart from the scope of the invention to contemplate a device 8 not coupled to another device for determining a type of parking space. In the example under consideration, the device 8 is configured so as to determine a type of parking space corresponding to a parallel parking space, a perpendicular parking space and a herringbone parking space. However, it of course does not depart from the scope of the invention to contemplate other types of parking space.

The device 8 has a detection module 10 directly or indirectly connected in terms of information to the on-board computer 4 and the camera 6. The module 10 gathers the data linked to the various targets detected by the camera 6. The module 10 also gathers odometry data of the vehicle 2. More precisely, the module 10 gathers a position of the vehicle 2 in a reference frame, an orientation of the vehicle 2 in the reference frame, a steering wheel angle, a speed of the vehicle 2 and a speed of the heading angle of the vehicle 2.

For each target, the detection module 10 gathers target position precision information. In this case, the position precision information is a position standard deviation. This item of data is delivered directly by image processing algorithms integrated into the camera 6. Whatever a target is, the position standard deviation of the target corresponds to a standard deviation of the positions of the target over several acquisitions by the camera 6. For each target, the detection module 10 also gathers target orientation precision information, in this case a standard deviation of the orientations of the target. This item of data is also delivered by the image processing algorithms integrated into the camera 6. Whatever a target is, the orientation standard deviation of the target corresponds to a standard deviation of the orientations of the target over several acquisitions by the camera 6.

The module 10 has a counter 11. Whatever a target is, the counter 11 determines a consecutive detection count signal associated with the target.

The device 8 has a filtering module 12. The role of the module 12 is to filter the targets detected by the camera 6 and gathered by the module 10. To this end, the module 12 is connected in terms of information to the module 10. The module 12 is equipped with hardware and software means for implementing steps of filtering the targets gathered by the module 10 on the basis of the data received by the module 10.

The device 8 comprises an evaluation module 14. The role of the module 14 is to evaluate, for each target target_i gathered by the module 10 and not rejected by the module 12, an orientation $\theta_{i/rte}$ of the target with respect to the road. To this end, the module 14 receives in particular the respective orientations of the targets gathered by the module 10. The module 14 also receives the odometry data received by the module 10 and a signal representative of the detection and of the shape of a ground marking defining the space intended for traffic flow.

The device 8 has a determination module 16. The role of the module 16 is to determine, on the basis of the orientations evaluated by the module 14, the type of parking space under consideration.

Figure 2:
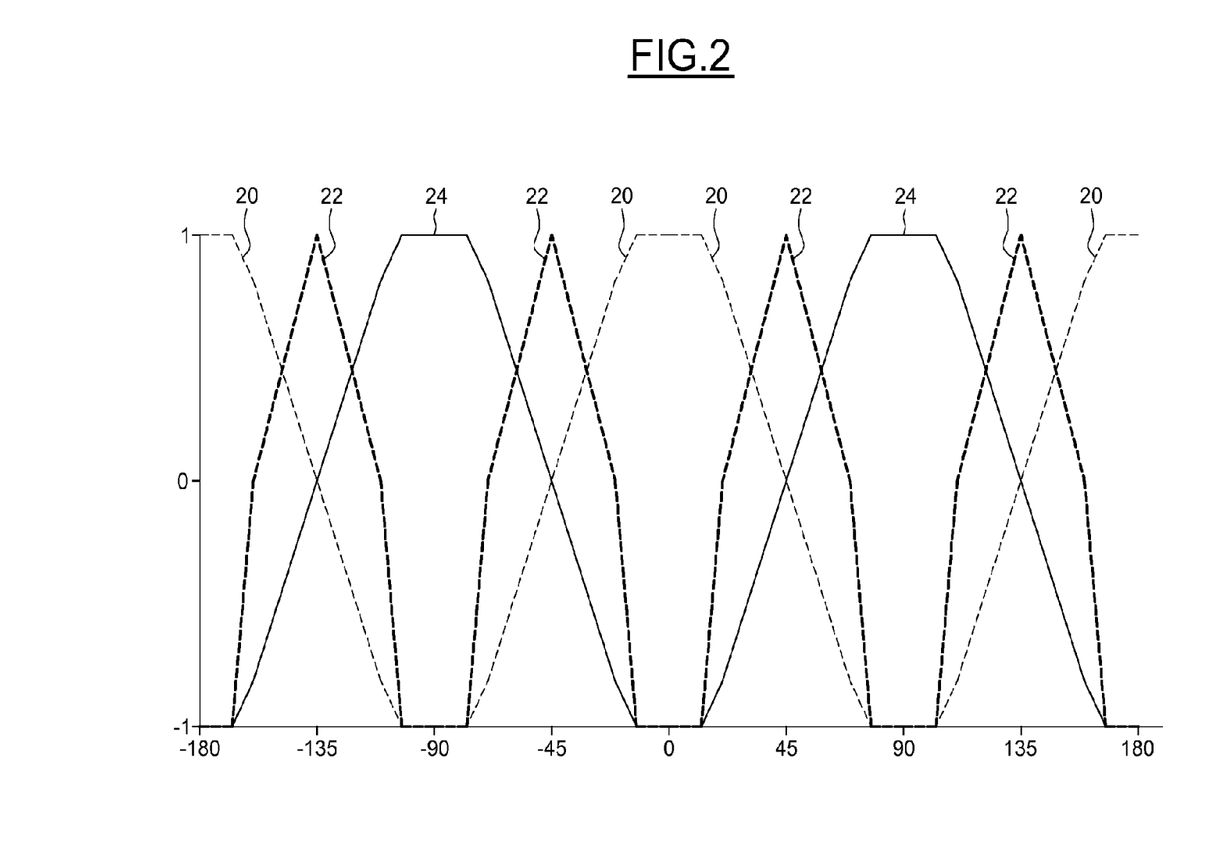
FIG. 2 is a graph illustrating a map containing parking space type term values as a function of an orientation of the target.

To this end, the module 16 has a map 18 storing the values of a parallel parking type term, a perpendicular parking type term and a herringbone parking type term as a function of an orientation of a target with respect to the road. The map 18 is shown in FIG. 2. The map 18 comprises a first curve 20, in thin dashed lines, corresponding to the values of the parallel parking type term. The second curve 22, in thick dashed lines, corresponds to the values of the herringbone parking type term. The third curve 24, in unbroken lines, corresponds to the values of the perpendicular parking type term. The curves 20, 22 and 24 are formed by a plurality of refined functions whose images are between −1 and 1. Whatever a target is, when the map 18 delivers a parallel, perpendicular or herringbone parking type term equal to 1, then the target is parallel-parked, perpendicular-parked or herringbone-parked, respectively.

Figure 3:
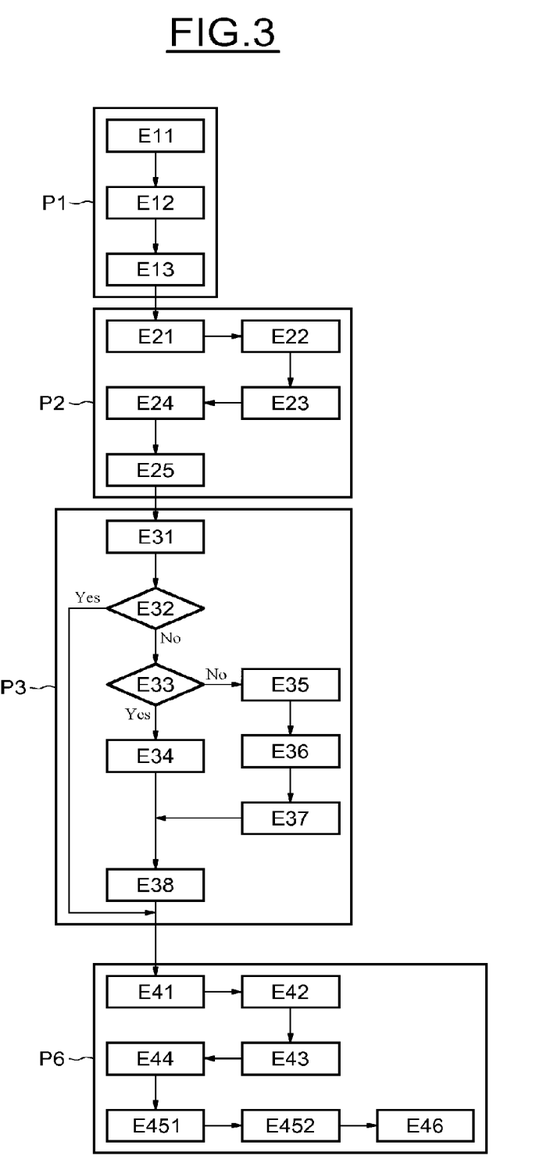
FIG. 3 is a flowchart illustrating a method according to another aspect of the invention.

By way of the device 8, it is possible to implement a method such as the one shown in FIG. 3. The method comprises a first phase P1, a second phase P2, a third phase P3 and a fourth phase P4. The method is intended to be implemented regularly, for example every second.

Phase P1 comprises a first step E11 in which the module 10 detects targets by way of the frontal camera 6. Each target is denoted target_i, where i is an integer. Whatever a target target_i is, its position with respect to the vehicle 2 is denoted $x_{i/veh}$, the standard deviation of its positions is denoted $\sigma_{x\_i}$, its speed is denoted $v_i$, its orientation with respect to the vehicle 2 is denoted $\theta_{i/veh}$, the standard deviation of its orientations is denoted $\sigma_{\theta\_i}$ and the count signal associated with this target is denoted $\bullet_i$. In the exemplary implementation of the method under consideration, ten targets are detected:

- target_1 is a perpendicular-parked vehicle 15 m in front of the vehicle 2,
- target_2 is a perpendicular-parked vehicle 15 m behind the vehicle 2,
- target_3 is a perpendicular-parked vehicle on a curve 25 m in front of the vehicle 2,
- target_4 is a herringbone-parked vehicle on a curve 25 m behind the vehicle 2,
- target_5 is a vehicle whose position $x_{5/rte}^{(0)}$ is detected with a poor detection quality,
- target_6 is a vehicle whose orientation $\theta_{6/rte}^{(0)}$ is detected with a poor detection quality,
- target_7 is a vehicle moving in the opposite direction to the vehicle 2,
- target_8 is a parked vehicle that was not detected two implementations of the method before,
- target_9 is a parked vehicle 45 m in front of the vehicle 2, and
- target_10 is a parked vehicle 60 m behind the vehicle 2.

Step E11 is followed by a step E12. Whatever i is, in step E12, the frontal camera 6 and the module 10 detect the data linked to the target target_i, that is to say the position $x_{i/veh}$, the standard deviation $\sigma_{x\_i}$, the speed $v_i$, the orientation $\theta_{i/veh}$ and the standard deviation $\sigma_{\theta\_i}$. The signal $\tau_i$ delivered by the counter 11 is also gathered.

In a following step E13, whatever target target_i is detected in a previous implementation of the method but not detected in the current implementation of the method, previous data are gathered that are the data linked to the target target_i that were detected in the previous implementation. Next, updated data $x_{i/veh}$, $\sigma_{x\_i}$, $v_i$, $\theta_{i/veh}$ and $\sigma_{\theta\_i}$ are determined. In order to determine the data $x_{i/veh}$, $v_i$ and $\theta_{i/veh}$, the previous data are updated, taking into account data linked to the vehicle, such as the movement speed of the vehicle, the vehicle steering wheel angle or the drift angle of the vehicle. The data $\sigma_{x\_i}$ and $\sigma_{\theta\_i}$ are identical to the corresponding previous data. Finally, the updated data are stored for a following step of subsequently implementing the method.

Phase P2 has a step E21 in which the standard deviation $\sigma_{x\_i}$ is compared with a threshold threshold_1. If the standard deviation $\sigma_{x\_i}$ exceeds the threshold threshold_1, the target target_i is rejected in step E21. In the example under consideration, the threshold threshold_1 is between 2 m and 4 m, preferably substantially equal to 3 m. In this case, the detection of the positions $x_{5/veh}$ of the target target_5 is of poor quality, such that the standard deviation $\sigma_{x\_5}$ exceeds the threshold threshold_1. The target target_5 is rejected in step E21.

Phase P2 has a step E22. Step E22 implements filtering of the remaining targets that is similar to the filtering in step E21, taking into account the standard deviation $\sigma_{\theta\_i}$. In the example under consideration, whatever i is, other than 5, the target target_i is rejected if $\sigma_{\theta\_i}$ exceeds a threshold threshold_2. The threshold threshold_2 is between 2° and 6°, and preferably substantially equal to 4°. In this case, the detection of the orientations of the target target_6 is of poor quality, such that the standard deviation $\sigma_{\theta\_6}$ exceeds the threshold threshold_2. As a result, the target target_6 is rejected in step E22.

Phase P2 comprises a step E23. In step E23, whatever i is, other than 5 or 6, the speed $v_i$ is compared with a threshold threshold_3 and, if the speed $v_i$ exceeds the threshold threshold_3, the target target_i is rejected in step E23. In the example illustrated, the threshold threshold_3 is between 8 km/h and 4 km/h, and preferably substantially equal to 6 km/h.

As an alternative, instead of considering the speed $v_i$, it is possible to consider the highest one of the speeds measured by the camera 6 for the target target_i. In this way, a situation is avoided whereby a vehicle that has stopped, for example a vehicle that has stopped due to congestion, a traffic light or a stop signal, is considered in the determination of a type of parking space.

In this case, the target target_7 is moving in the opposite direction to the vehicle 2. The speed $v_7$ is therefore far greater than the threshold threshold_3. As a result, the target target_7 is rejected in step E23.

Phase P2 has a step E24 in which, whatever i is, other than 5, 6 or 7, the signal $\Sigma_i$ is compared with a count threshold threshold_4. If the signal $\Sigma_i$ is strictly less than the threshold threshold_4, then the target target_i is rejected in step E24. In the example under consideration, the threshold threshold_4 is equal to 5. However, it is of course possible without departing from the scope of the invention to contemplate a completely different number. In this case, the target target_8 has not been detected in the second implementation of the method immediately prior to the current implementation. As a result, the signal $\Sigma_8$ is equal to 2. The target target_8 is then rejected in step E24.

Phase P2 has a step E25 in which, whatever i is, other than 5, 6, 7 or 8, the distance between the target target_i and the vehicle 2 is compared. The determined distance is then compared with a threshold threshold_5. In the example under consideration, the threshold threshold_5 is equal to 30 m. If the determined distance exceeds the threshold threshold_5, the target target_i is rejected in step E25. In this case, the distance determined for the target target_9 is 45 m. This distance exceeds the threshold threshold_5. The target target_9 is rejected in step E25. Likewise, the distance for the target target_10 is 60 m. The target target_10 should be rejected in step E25. At the end of step E25, phase P2 is ended.

Phase P3 has a first step E31 of evaluating the orientation of the targets that are retained and situated on a road portion in a straight line on which the vehicle 2 is traveling. In step E31, whatever i is, it is determined whether the target target_i is situated along a straight line corresponding to the longitudinal direction of the vehicle 2. If this is the case, the orientation $\theta_{i/rte}$ is equal to the orientation $\theta_{i/rte}^{(0)}$. In the example under consideration, the targets target_1 and target_2 are not rejected in phase P2 and are parked along a straight line portion on which the vehicle 2 is traveling. Thus, in step E31, the orientation of the targets target_1 and target_2 is defined as follows:

$$\begin{cases} \theta_{1/rte} = \theta_{1/veh}^{(0)} \\ \theta_{2/rte} = \theta_{2/veh}^{(0)} \end{cases}$$

Phase P3 has a second step E32 in which it is determined whether there are targets that are retained and parked along a road portion forming a curve. If the answer is "no", phase P3 is ended. In this case, the targets target_3 and target_4 are parked on curves. The answer to step E32 is therefore "yes".

In this case, a step E33 is applied in which it is determined whether the curves on which the targets are situated have a ground marking. To this end, it is possible to use the camera 6 and the module 10. If the answer to step E33 is "yes", a step E34 is applied. If the answer to step E33 is "no", a step E35 is applied.

In step E34, an orientation of the road is determined on the basis of the ground marking. More precisely, whatever target target_i is situated on a curve, the orientation of the road corresponds to the orientation of the road at the point closest to the target target_i with respect to the vector base 3. There is then a transition to a step E38, which will be described below.

In step E35, a past trajectory of the vehicle 2 is gathered. In this case, the past trajectory corresponds to the last thirty meters covered by the vehicle. To this end, it is possible to use a memory (not shown) incorporated in the on-board computer 4 storing the trajectory of the vehicle 2.

Step E35 is followed by a step E36 in which a probable trajectory of the vehicle 2 is anticipated. In order to determine the probable trajectory of the vehicle 2, the speed $v_{2/rte}$ of the vehicle 2, the steering wheel angle $\alpha_2$ of the vehicle 2 and the drift angle $\beta_2$ of the vehicle 2 are gathered. The probable trajectory is defined assuming that the speed $v_{2/rte}$, the angle $\alpha_2$ and the angle $\beta_2$ remain constant over the whole probable trajectory. Of course, it does not depart from the scope of the invention to contemplate just one or two of these three scenarios.

In step E37, an orientation of the road at the location of the target is defined as being a tangent to the past trajectory or to the probable trajectory of the vehicle 2 at the point closest to the target. In this case, the target target_4 is not rejected in phase P2 and is parked on a curve behind the vehicle 2. The orientation of the road at the location of the target target_4 is directed by the tangent to the past trajectory at the point closest to the target target_4. Likewise, the target target_3 is situated on a curve in front of the vehicle 2 and does not have any road markings. The orientation of the road at the location of the target target_3 is directed by the tangent to the probable trajectory at the point closest to the target target_3. At the end of step E37, step E38 is applied.

In step E38, whatever i is, corresponding to a target target_i retained in phase P2 and situated along a curve, the orientation $\theta_{i/rte}$ is calculated. To this end, the orientation of the road at the location of the target determined in step E34 or in step E37 is used. In the example illustrated, the targets target_3 and target_4 are situated on curves that do not have any ground markings. The orientation determined in step E37 is therefore used. At the end of step E38, phase P3 is ended.

In the example illustrated, phase P3 implements two different modes of evaluating the orientation of the targets with respect to the road, depending on whether or not the target is situated on a straight line portion on which the vehicle is traveling. It is of course possible without departing from the scope of the invention to contemplate using just one of these two evaluation modes. In a first variant, phase P3 comprises only step E31. Such a variant is advantageous in that its design is simpler and that it works on straight lines in the same way as in a conventional parking lot. According to a second variant, phase P3 comprises only steps E33 to E38. Although such a variant is more complicated, it makes it possible to take into account the orientation of the road in order to take into consideration targets situated on bends and adopt an orientation gap between the vehicle and the road.

Phase P4 has a first step E41 of reading the map 18. More precisely, whatever i is, corresponding to a target target_i not rejected in phase P2, the orientation $\theta_{i/rte}$ is entered at input of the map 18 and a term $t\_c_i$ is read on the curve 20, a term $t\_b_i$ is read on the curve 22 and a term $t\_e_i$ is read on the curve 24. The term $t\_c_i$ is equal to 1 if the target target_i is parallel-parked and to −1 if not. Likewise, the terms $t\_b_i$ and $t\_e_i$ are equal to 1 if the target target_i is perpendicular-parked and herringbone-parked, respectively. In this case, the targets target_1, target_2 and target_3 are perpendicular-parked whereas the target target_4 is herringbone-parked. As a result:

$$\begin{cases} \theta_{1/rte} = \theta_{2/rte} = \theta_{3/rte} = 0° \\ \theta_{4/rte} = 45° \end{cases}$$

and therefore:

$$\begin{cases} t\_c_1 = t\_c_2 = t\_c_3 = t\_c_4 = t\_b_4 = t\_e_1 = t\_e_2 = t\_e_3 = -1 \\ t\_b_1 = t\_b_2 = t\_b_3 = t\_e_4 = 1 \end{cases}$$

Phase P4 has a step E42 of calculating a coefficient $c\_d_i$ representative of a distance of the target from the vehicle. Whatever i is, corresponding to a target target_i not rejected in phase P2, the coefficient $c\_d_i$ is determined as a decreasing function of the distance between the target target_i and the vehicle 2. In the example under consideration, the coefficient $c\_d_i$ is equal to 1 if the distance between the vehicle 2 and the target target_1 is less than 20 m and to 0.25 if the distance between the target target_i and the vehicle 2 is greater than 20 m. In this case:

$$\begin{cases} c\_d_1 = c\_d_2 = 1 \\ c\_d_3 = c\_d_4 = 0.25 \end{cases}$$

Phase P4 comprises a step E43 of determining a coefficient $c\_\theta_i$ representative of taking into account a ground marking on the road in order to evaluate the orientation of the road at the location of the target. In the example under consideration, whatever i is, corresponding to a target target_i not rejected in phase P2, the coefficient $c\_\theta_i$ is equal to 0.25 if the orientation of the road at the location of the target target_i was determined in step E37, or equal to 1 if not. In this case:

$$\begin{cases} c\_\theta_1 = c\_\theta_2 = 1 \\ c\_\theta_3 = c\_\theta_4 = 0.25 \end{cases}$$

Phase P4 comprises a step E44 in which a coefficient $c\_e_i$ representative of a lateral gap between the target and a trajectory of the vehicle is determined. In step E44, a lateral gap between the trajectory of the vehicle 2 and the position of a target is determined. If, whatever i is, corresponding to a target target_i not rejected in phase P2, the lateral gap for the target target_i is less than a threshold threshold_6, the coefficient $c\_e_i$ is equal to 1. If not, the coefficient $c\_e_i$ is equal to 0.25. In the example illustrated, the threshold threshold_6 is equal to 1.5 times the length of the vehicle 2.

The trajectory of the vehicle 2 under consideration may be the past trajectory and/or the probable trajectory determined in steps E35 and E36. In this case, the targets target_1, target_2 and target_3 are parked along the road, whereas the target target_4 is parked in a side street. The lateral distance between the trajectory of the vehicle 2 and the target target_4 therefore exceeds the threshold threshold_6:

$$\begin{cases} c\_e_1 = c\_e_2 = c\_e_3 = 1 \\ c\_e_4 = 0.25 \end{cases}$$

Phase P4 comprises a step E451 in which the terms t t_$e_i$, t_$c_i$ are weighted with the various coefficients c_$d_i$, c_$\theta_i$ and c_$e_i$, and a step E452 in which the weighted terms are summed. More precisely, in steps E451 and E452, three sums $\Sigma b$, $\Sigma e$ and $\Sigma c$ are calculated:

$$\sum b = \sum_{i \in [1,4]} t\_b_i \cdot c\_d_i \cdot c\_\theta_i \cdot c\_e_i$$

$$\sum e = \sum_{i \in [1,4]} t\_e_i \cdot c\_d_i \cdot c\_\theta_i \cdot c\_e_i$$

$$\sum c = \sum_{i \in [1,4]} t\_c_i \cdot c\_d_i \cdot c\_\theta_i \cdot c\_e_i$$

In this case, with the values established previously, the calculated sums have the following values:

$\Sigma b = 2.046875$
$\Sigma e = -2.046875$
$\Sigma c = -2.078125$

Phase P4 comprises a step E46 of determining the type of parking space. In step E46, the calculated sums are compared. More precisely, for each sum $\Sigma b$, $\Sigma e$ or $\Sigma c$, an offset sum $\Sigma b'$, $\Sigma e'$ or $\Sigma c'$ is calculated by adding a strictly positive offset term $t_{offset}$. In the example illustrated, the term $t_{offset}$ is equal to 1. If there are three sums $\Sigma b$, $\Sigma e$ or $\Sigma c$ greater than the offset sums calculated from the other two sums, then the type of parking space corresponds to the parking space of this sum:

if $\Sigma b > \Sigma c + t_{offset}$ and $\Sigma b > \Sigma e + t_{offset}$, then the parking space is a perpendicular parking space, if $\Sigma c > \Sigma b + t_{offset}$ and $\Sigma c > \Sigma e + t_{offset}$, then the parking space is a parallel parking space, if $\Sigma e > \Sigma c + t_{offset}$ and $\Sigma e > \Sigma b + t_{offset}$, then the parking space is a herringbone parking space.

If such a sum does not exist, then the type of parking space close to the vehicle 2 is not determined.

In this case, the sum $\Sigma b$ is greater than each of the added sums $\Sigma e$ and $\Sigma c$ plus the term $t_{offset}$. The parking space is therefore a perpendicular parking space.

The term $t_{offset}$ makes it possible to increase the reliability of the determination of the type of parking space. However, the presence of this term leads to the possibility of a lack of a conclusion with regard to the type of parking space. It is of course possible without departing from the scope of the invention to modify the value of this term in order to adjust the compromise between reliability and driver convenience. It is also possible to eliminate the offset, in which case a type of parking space is virtually always determined.

Without departing from the scope of the invention, it is also possible to contemplate different offset terms for each comparison. It is possible in this case to make asymmetric compromises in order to increase confidence with regard to determining a type of parking space.

In light of the above, the invention makes it possible to reliably determine a type of parking space well before the vehicle travels past an available parking space and works even in the absence of any ground markings defining the parking spaces.

The invention claimed is:

1. A method for determining a type of parking space for a motor vehicle, comprising:
   detecting a target;
   evaluating an orientation of the target, the orientation of the target being evaluated:
      when the target is situated on a road portion that is in a straight line with respect to a road portion on which the vehicle is traveling, in relation to the road portion on which the vehicle is traveling, and
      when the target is situated on a road portion that is curved at a location of the target with respect to the road portion on which the vehicle is traveling, in relation to the road portion that is curved at the location of the target; and
   determining the type of parking space based on the evaluated orientation,
   wherein the detecting is implemented by way of a frontal camera of the vehicle.

2. The method as claimed in claim 1, wherein the detecting includes determining data linked to the target, the data linked to the target comprising a target consecutive detection count signal, a position of the target, a variable representative of a precision of the position of the target, a speed of the target, an orientation of the target and a variable representative of the orientation of the target,
   wherein the method further comprises filtering between the detecting and the evaluating, the filtering comprising at least one filtering chosen from among:
      an imprecise position filtering in which the target is rejected when the variable representative of the precision of the position exceeds a position threshold, and when the variable representative of the precision of the position does not exceed the position threshold, the target is retained,
      an imprecise orientation filtering in which the target is rejected when the variable representative of the precision of the orientation exceeds an orientation threshold, and when the variable representative of the precision of the orientation does not exceed the orientation threshold, the target is retained,
      a moving vehicle filtering in which the target is rejected when the speed of the target exceeds a third threshold, and when the speed of the target does not exceed the third threshold, the target is retained, and
      a phantom detection filtering in which the target is filtered when the consecutive detection count signal is less than the count threshold, and when the consecutive detection count signal is not less than the count threshold, the target is retained.

3. The method as claimed in claim 1, wherein the detecting includes determining a position of the target,
   wherein the method further comprises filtering, between the detection phase and the evaluation phase, in which the target is rejected when a distance between the position of the target and the vehicle exceeds a distance threshold, and when the distance between the position of the target and the vehicle does not exceed the distance threshold, the target is retained.

4. The method as claimed in claim 1, wherein the evaluating includes determining an orientation of the road at the location of the target, and the orientation of the target in relation to the road is evaluated based on the orientation of the road at the location of target.

5. The method as claimed in claim 4, wherein
when the road has a ground marking, the orientation of the road at the location of the target is determined taking into account the ground marking,
when the road does not have any ground markings and when the target is behind the vehicle or at the same location as the vehicle, a past trajectory of the vehicle is determined and the orientation of the road at the location of the target is evaluated based on the past trajectory at the location of the target, and
when the road does not have any ground markings and when the target is in front of the vehicle, a probable trajectory of the vehicle is determined and the orientation of the road at the location of the target is determined based on the probable trajectory at a point closest to the target.

6. The method as claimed in claim 5, wherein, when the probable trajectory of the vehicle is determined, at least one scenario is accepted that is chosen from among:
a speed scenario in which a speed of the vehicle remains constant,
an acceleration scenario in which an acceleration of the vehicle remains constant,
a steering wheel angle scenario in which a steering wheel angle of the vehicle remains constant, and
a drift angle scenario in which a drift angle of the vehicle remains constant.

7. The method as claimed in claim 1, wherein the detecting includes detecting a plurality of targets are detected, and
wherein, during the determining, whatever the target is, at least one first term and one second term are associated with the target, the first term and the second term being chosen from among:
a parallel parking type term,
a perpendicular parking type term, and
a herringbone parking type term,
and then a first sum of the first terms of the plurality of targets and a second sum of the second terms of the plurality of targets are calculated, and whether one of the first and second sums is greater than the other is determined, and preferably whether one of the first and second sums is greater than the other plus a strictly positive offset term.

8. The method as claimed in claim 7, wherein, whatever the target is, at least one coefficient is associated with the target, the at least one coefficient being chosen from among:
a coefficient representative of a distance of the target from the vehicle,
a coefficient representative of taking into account a ground marking on the road in order to evaluate the orientation of the target with respect to the road, and
a coefficient representative of a lateral gap between the target and a trajectory of the vehicle,
and, before the first and second sums are calculated, the first and second terms associated with the target are weighted by the coefficient associated with the target.

9. The method as claimed in claim 1, wherein the detecting includes detecting a plurality of targets are detected, and
wherein, during the determining, whatever the target is, at least one first term and one second term are associated with the target, the first term and the second term being chosen from among:
a parallel parking type term,
a perpendicular parking type term, and
a herringbone parking type term,
and then a first sum of the first terms of the plurality of targets and a second sum of the second terms of the plurality of targets are calculated, and whether one of the first and second sums is greater than the other plus a strictly positive offset term is determined.

10. A non-transitory computer readable medium storing a computer program that, when executed by a processor or an electronic control unit, causes the computer to implement the method as claimed in claim 1.

11. A device that determines a type of parking space for a motor vehicle, the device being configured to be housed on board a motor vehicle, said device comprising:
processing circuitry configured to:
detect a target, the processing circuitry being configured to be connected in terms of information to a frontal camera of the motor vehicle;
evaluate an orientation of the target, the orientation of the target being evaluated:
when the target is situated on a road portion that is in a straight line with respect to a road portion on which the vehicle is traveling, in relation to the road portion on which the vehicle is traveling, and
when the target is situated on a road portion that is curved at a location of the target with respect to the road portion line on which the vehicle is traveling, in relation to the road situated that is curved at the location of the target; and
determine a type of parking space, taking into account the orientation evaluated by the processing circuitry.

* * * * *